United States Patent

Jonner et al.

[11] Patent Number: 5,124,921
[45] Date of Patent: Jun. 23, 1992

[54] METHOD OF GENERATING A SIGNAL TO INDICATE A CURVE

[75] Inventors: Wolf-Dieter Jonner, Beilstein-Schmidhausen; Gerd Reimann, Grossbottwar; Dieter Roller, Neuwied, all of Fed. Rep. of Germany

[73] Assignee: Robert Bosch GmbH, Stuttgart, Fed. Rep. of Germany

[21] Appl. No.: 466,459

[22] PCT Filed: Oct. 28, 1988

[86] PCT No.: PCT/EP88/00976
§ 371 Date: Jul. 13, 1990
§ 102(e) Date: Jul. 13, 1990

[87] PCT Pub. No.: WO89/04782
PCT Pub. Date: Jun. 1, 1989

[30] Foreign Application Priority Data
Nov. 21, 1987 [DE] Fed. Rep. of Germany ....... 3739558

[51] Int. Cl.$^5$ ................................................ B60T 8/72
[52] U.S. Cl. ............................ 364/426.01; 364/426.02; 303/95; 303/100

[58] Field of Search .............. 364/426.01, 426.02, 364/426.03, 565; 303/95, 96, 100; 180/197

[56] References Cited

U.S. PATENT DOCUMENTS

| | | | |
|---|---|---|---|
| 4,593,955 | 6/1986 | Leiber | 303/106 |
| 4,777,611 | 10/1988 | Tashiro et al. | 364/426.01 |
| 4,844,556 | 7/1989 | Fennel et al. | 364/426.01 |
| 4,852,009 | 7/1989 | Jonner et al. | 364/426.02 |
| 4,902,076 | 2/1990 | Ushijima et al. | 303/100 |
| 4,917,444 | 4/1990 | Ishido et al. | 303/100 |
| 4,933,856 | 6/1990 | Leiber | 364/426.01 |
| 4,962,971 | 10/1990 | Miyake | 303/100 |
| 5,005,132 | 4/1991 | Yoshino | 364/426.02 |
| 5,021,957 | 6/1991 | Yoshino et al. | 364/426.02 X |

*Primary Examiner*—Parshotam S. Lall
*Assistant Examiner*—Thomas S. Auchterlonie
*Attorney, Agent, or Firm*—Felfe & Lynch

[57] ABSTRACT

The differences $\Delta V$ of the speed signals of diagonally opposed wheels and the time variation signals of these differences are formed. If at least one of these signals exceeds a prescribed threshold, a curve detection signal is supplied which can be used to shut down the delay of the yaw speed build-up in an ABS.

3 Claims, 1 Drawing Sheet

METHOD OF GENERATING A SIGNAL TO INDICATE A CURVE

BACKGROUND OF THE INVENTION

German DS 34 21 700, to which U.S. Pat. No. 4,593,955 corresponds, discloses an anti-lock brake control system which includes sensors, an evaluation circuit and brake pressure controls. The front wheels are individually controlled, but there is a delay of the yaw torque build-up at a front wheel running on a surface with a higher μ (high wheel) with a start of the control, this delay slows down the pressure build-up at a front wheel running on a surface with a lower μ (low wheel). The purpose of this measure is to slow down the generation of yaw torques around the vertical vehicle axis on road surfaces with an asymmetric friction coefficient such that the vehicle remains under controlled operation.

This delay of yaw torque build-up, however, is disadvantageous when a vehicle passes a curve and during the then following control for two reasons. First, a vehicle which is subject to braking exhibits in the curve a rotation into the circle. Second the delay of the yaw torque build-up causes the generation of a counter-directed torque to be delayed because of the immediate full braking effect at the front wheel at the outer edge of the curve. Said publication therefore proposes to shut off the delay of the yaw torque build-up in a curve and to individually control the pressure in the wheel brakes of the front wheels. A transverse acceleration sensor is used to detect the curves.

It is disadvantageous that a transverse acceleration sensor must be used which in turn requires additional monitoring means.

SUMMARY OF THE INVENTION

Assuming that wheel speed sensors are provided for different reasons (e.g. ABS), a curve can be detected without additional sensors by measuring the speed difference of diagonally opposed wheels and generating a signal corresponding to this difference or the variation of this difference with time. When at least one of these signals exceeds a prescribed limit, a signal which indicates the curve is generated.

The so recovered curve signal can be used, for example, to shut off the delay of the yaw torque build-up, to switch slippage- and acceleration thresholds in the evaluation circuit and also to monitor the transverse acceleration sensor.

During steady speed through a curve even without braking, there is a speed difference in at least one diagonal. In a left curve, the diagonal left front wheel/right rear wheel of a rear-wheel-driven vehicle exhibits such a difference. In case of a front wheel drive vehicle, under the same conditions, it is just the opposite diagonal. In a right curve, the diagonal right front wheel/left rear wheel of a rear wheel drive vehicle exhibits the difference, while it is the opposite diagonal for a front drive vehicle.

Using only the speed difference, it is advantageous, to signal the curve detection only after the difference has been present for a certain period of time. This time varies for different types of vehicles and is on the order of several hundred milliseconds. The threshold for $\Delta V$, after which there is a difference sufficient for curve detection, also depends upon the vehicle type. It ranges in the magnitude of 1-3 km/h. It appears advantageous to set the threshold such that curve detection starts at a transverse acceleration of approximately 0.5 g.

It also turned out that during unsteady speed in a curve, there are variations in the rotational speed difference. These too can be used for curve detection. Advantageously, both signal types are used together. The above mentioned monitoring period for the speed difference can then be reduced.

DETAILED DESCRIPTION OF THE PREFERRED EMBODIMENT

Figure 1:
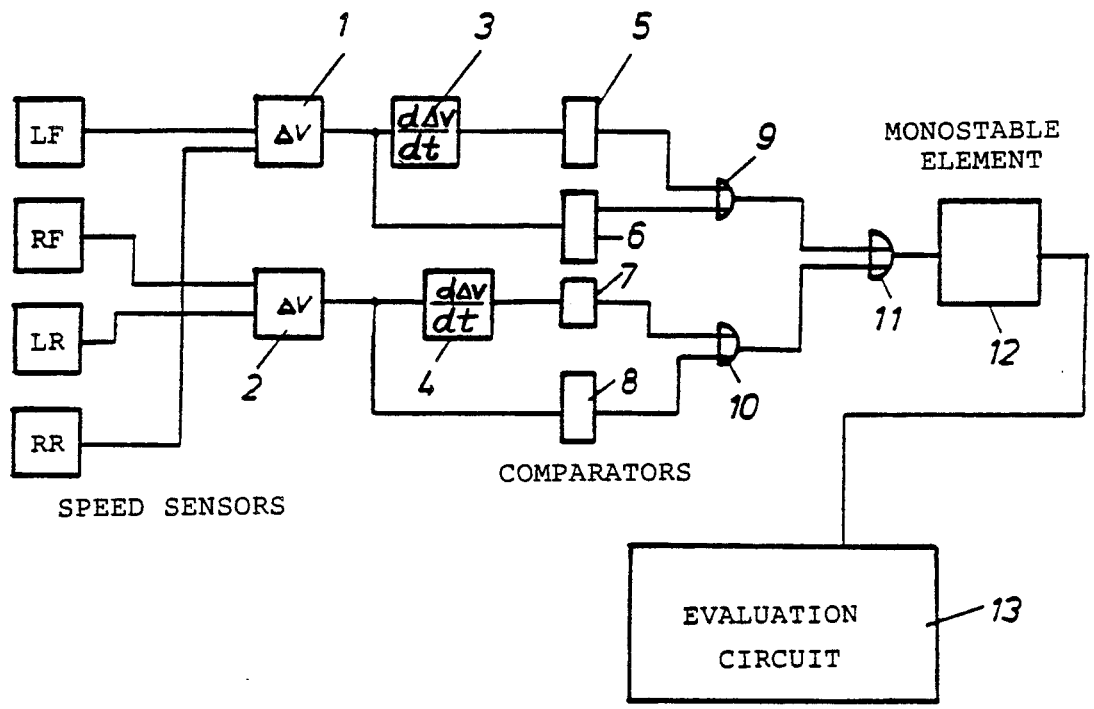
FIG. 1 is a block diagram in accordance with the invention and the use of the curve detection signal for shutting down the delay of the yaw torque build-up.

FIG. 1 shows four sensors for measuring the wheels speeds which are referenced as LF (left/front), RF (right/front), LR (left/rear) and RR (right/rear). The signals of the sensors belonging to a diagonal are connected to a respective subtractor 1, 2. The differences $\Delta V$ are supplied to blocks 3 and 4 where change signals in dependency upon time are formed.

In comparators 6 and 8, the speed differences $\Delta V$ are compared to first threshold values. In comparators 5 and 7, the change signals are compared to second threshold values. If a comparator 5 or 6 or 7 or 8 determines that a threshold has been exceeded, it supplies a signal, and a monostable element 12 with a prescribed time constant is set via the OR-gates 9 and 10 and via an OR-gate 11. The output signal thereof is supplied to the evaluation circuit 13 of an ABS where it shuts down the delay of the yaw torque build-up. After the signal supplied by one of the OR-gates 9 and 10 is terminated, and after the time constant of the monostable element 12 has elapsed, the shut down of the delay of the yaw torque build-up is terminated unless an ABS-control procedure is being executed.

Figure 2:
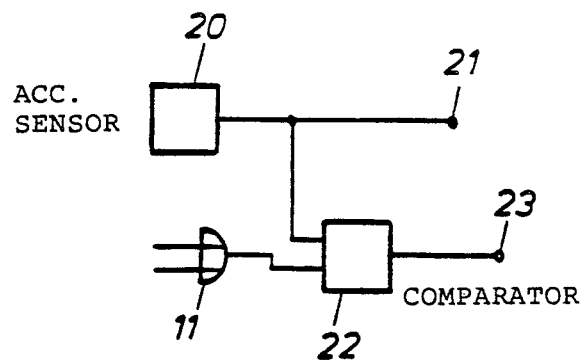
FIG. 2 is additional possibility of application.

In FIG. 2 it is assumed that a transverse acceleration sensor 20 is used for the shut down via a terminal 21 and that the signal of the OR-gate 11 is used for monitoring this transverse acceleration sensor 20. For this purpose, the signals which indicate a curve are supplied to a comparator 22. The latter supplies a warning and/or shut-down signal via terminal 23 when a curve is detected via the arrangement of FIG. 1 without the release of a corresponding signal by the transverse acceleration sensor 20.

We claim:

1. Method for controlling yaw torque build-up in a vehicle having two front wheels and two rear wheels in diagonally opposed pairs and equipped with an anti-lock brake control system wherein the brake pressure at said front wheels is individually controlled to delay the yaw torque build-up when one front wheel runs on road surface having a higher friction coefficient than the other front wheel by slowing down the pressure build-up at the front wheel running on the surface with a lower friction coefficient, said method comprising measuring the speeds of the four wheels, calculating the difference of the speeds of the wheels in each pair of diagonally opposed wheels to produce two difference values $\Delta v$, comparing said difference values $\Delta v$ to first prescribed threshold values, generating a signal indicative of the vehicle passing through a curve when one of said first threshold values is exceeded, and shutting down the delay of yaw torque build-up when said signal is generated.

2. Method for controlling yaw torque build-up in a vehicle having two front wheels and two rear wheels in diagonally opposed pairs and equipped with an anti-lock brake control system wherein the brake pressure at said front wheels is individually controlled to delay the yaw torque build-up when one front wheel runs on road surface having a higher friction coefficient than the other front wheel by slowing down the pressure build-up at the front wheel running on the surface with a lower friction coefficient, said method comprising measuring the speeds of the four wheels, calculating the difference of the speeds of the wheels in each pair of diagonally opposed wheels to produce two difference values $\Delta v$, calculating the change in $\Delta v$ for each pair of diagonally opposed wheels over time to produce change values $d\Delta v/dt$, comparing said change values $d\Delta v/dt$ to second prescribed threshold values, generating a signal indicative of the vehicle passing through a curve when said one of second threshold values is exceeded, and shutting down the delay of yaw torque build-up when said signal is generated.

3. Method for controlling yaw torque build-up in a vehicle having two front wheels and two rear wheels in diagonally opposed pairs and equipped with an anti-lock brake control system wherein the brake pressure at said front wheels is individually controlled to delay the yaw torque build-up when one front wheel runs on road surface having a higher friction coefficient than the other front wheel by slowing down the pressure build-up at the front wheel running on the surface with a lower friction coefficient, said method comprising measuring the speeds of the four wheels, calculating the difference of the speeds of the wheels in each pair of diagonally opposed wheels to produce two difference values $\Delta v$, comparing said difference values $\Delta v$ to first prescribed threshold values, calculating the change in $\Delta v$ for each pair of diagonally opposed wheels over time to produce change values $d\Delta v/dt$, comparing said change values $d\Delta v/dt$ to second prescribed threshold values, generating a signal indicative of the vehicle passing through a curve when one of said threshold values is exceeded, and shutting down the delay of yaw torque build-up when said signal is generated.

* * * * *